United States Patent
Bergami

(10) Patent No.: US 12,352,227 B2
(45) Date of Patent: Jul. 8, 2025

(54) AIR INTAKE UNIT FOR A VEHICLE ENGINE

(71) Applicant: BMC S.R.L., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 0 days.

(21) Appl. No.: 18/354,008

(22) Filed: Jul. 18, 2023

(65) Prior Publication Data
US 2024/0026844 A1   Jan. 25, 2024

(30) Foreign Application Priority Data
Jul. 19, 2022   (IT) .................. 102022000015141

(51) Int. Cl.
*F02M 35/10* (2006.01)
*B64D 33/02* (2006.01)

(52) U.S. Cl.
CPC ....... *F02M 35/10262* (2013.01); *B64D 33/02* (2013.01); *B64D 2033/0253* (2013.01)

(58) Field of Classification Search
CPC .......................... B64D 33/02; B64D 33/0246; B64D 33/0293; B64D 2033/0293; B64D 2033/0253; F02M 35/10262; F02C 7/042
See application file for complete search history.

(56) References Cited

U.S. PATENT DOCUMENTS

| | | | |
|---|---|---|---|
| 3,411,272 A * | 11/1968 | Camron | F24F 13/28 |
| | | | 55/306 |
| 5,662,292 A | 9/1997 | Greene et al. | |
| 6,240,582 B1 * | 6/2001 | Reinke | A61G 13/02 |
| | | | 5/601 |
| 7,712,462 B2 * | 5/2010 | Pedicini | F41B 11/57 |
| | | | 124/65 |

(Continued)

FOREIGN PATENT DOCUMENTS

| CH | 347383 A | 6/1960 |
|---|---|---|
| EP | 2 282 031 A1 | 2/2011 |

(Continued)

OTHER PUBLICATIONS

Italian Office Action dated Feb. 8, 2023 from corresponding Italian Patent Application No. 102022000015141, 7 pages.

*Primary Examiner* — Courtney D Heinle
*Assistant Examiner* — Michael K. Reitz
(74) *Attorney, Agent, or Firm* — Ruggiero McAllister & McMahon LLC

(57) ABSTRACT

An air intake unit for an engine of a vehicle includes a housing, a bypass air intake, a shutter element, and actuator. A plenum is defined inside the housing which can be connected to the engine. Air coming from the outside needed for the operation of the engine can be sucked into the plenum through the bypass air intake. The shutter element is coupled to the bypass air intake and is mounted to move between a closed position, in which the shutter element closes the (Continued)

bypass air intake, and an open position, in which the shutter element leaves the passage through the bypass air intake free. The actuator is configured to move the shutter element between the closed position and the open position. The actuator has a spring configured to generate, by expanding, an opening movement moving the shutter element from the closed position to the open position.

10 Claims, 6 Drawing Sheets

(56) References Cited

U.S. PATENT DOCUMENTS

| | | | |
|---|---|---|---|
| 2007/0018033 A1* | 1/2007 | Fanucci | F42B 15/22 244/49 |
| 2007/0025838 A1 | 2/2007 | Stelzer | |
| 2014/0158833 A1* | 6/2014 | Braeutigam | B64D 33/02 96/405 |
| 2020/0277897 A1* | 9/2020 | O'Brien | B64C 29/0033 |
| 2020/0355010 A1* | 11/2020 | Aceto | E05F 15/635 |

FOREIGN PATENT DOCUMENTS

| | | |
|---|---|---|
| EP | 2 957 503 A1 | 12/2015 |
| EP | 3121415 A1 | 1/2017 |
| EP | 3121416 A1 | 1/2017 |
| EP | 3392144 A1 | 10/2018 |
| EP | 3601057 A1 | 2/2020 |
| EP | 3 736 403 A1 | 11/2020 |
| GB | 2957403 A1 | 12/2015 |
| IT | 2020 0000 8230 A1 | 10/2021 |

* cited by examiner

AIR INTAKE UNIT FOR A VEHICLE ENGINE

CROSS-REFERENCE TO RELATED APPLICATIONS

This patent application claims priority from Italian patent application no. 102022000015141 filed on Jul. 19, 2022, the entire content of which is incorporated herein by reference.

BACKGROUND OF THE DISCLOSURE

1. Field of the Disclosure

The present disclosure concerns an air intake unit for a vehicle engine.

The present disclosure can be advantageously applied to a helicopter, to which the following description will explicitly refer without loss of generality.

2. Description of Related Art

Modern helicopters are provided with at least one engine that requires a continuous flow of fresh air for the operation thereof; the term engine refers both to main engines that operate the blade assembly, and the auxiliary engines (also called APU—Auxiliary Power Unit) that operate auxiliary services. In order to supply fresh air to each engine, the helicopter is provided with at least one air intake which can be equipped with a filtering system and a duct (also called plenum) which is arranged downstream of the filtering system and terminates in the engine.

Suction of the air through an air intake can be dynamic (also called RAM) when the dynamic pressure of the air generated by the helicopter movement is used to increase the intake static pressure and therefore improve the volumetric efficiency of the engine; in this case the air intake is oriented (at least partly) perpendicularly to the direction of movement. Alternatively, suction of the air through an air intake can be static when the fresh air is sucked in due only to the depression generated by the engine; in this case the air intake is oriented laterally to the direction of movement (therefore in the area of a lateral or upper wall of the fuselage).

A helicopter must be able to operate in a wide variety of ambient conditions and therefore it must be possible to protect each helicopter engine so that it can operate also in extreme ambient conditions: for example in the presence of high levels of dust as in sandy environments (beaches, deserts . . . ) or in the presence of many foreign bodies (like dry leaves . . . ).

The greatest danger for the engines of a helicopter is the ingestion of dust or other solid particles suspended in the atmosphere (due both to atmospheric proper motion and to the effect of the helicopter blades). In order to protect the engines from these dangers, each intake unit can be equipped with at least one filtering system provided with its own air filter to stop the particles and therefore protect the engines. The air filter can be a barrier filter (namely with one or more layers of porous material that trap the particles), or a centrifugal filter (namely exploiting the centrifugal force to separate the heaviest solid particles from the incoming air flow).

The presence of a filtering system prolongs the life of the engines, but at the same time generates a potential threat for the flight operations since a filtering system can be totally or partially obstructed if the quantity of solid particles accumulated or the flow rate of solid particles exceeds the capacity of the air filter or if ice has formed. If the filtering system becomes totally or partially blocked, the corresponding engine can suffer a significant loss (in the worst case, total loss) of power which can cause an accident. To guarantee an adequate flow rate of air towards the engine at all times also in the case of clogging of the air filter, each filtering system is provided with an alternative or secondary intake route (also called bypass route or IBF—Integrated Bypass Function) which allows the engine to be supplied with air coming from the outside without passing through the air filter; this ensures safe correct operation of the engines in all flight conditions.

In other words, the bypass function is an emergency system which is used to guarantee the necessary supply of air to the helicopter engine at all times, even when the air filter is clogged.

The patent application EP2282031A1 describes an air intake unit for an aircraft engine, in which the air filter is mounted in a movable manner (for example by means of a rotary movement or a linear movement) to free, when necessary, the bypass intake. The patent applications GB1201096A, EP3121415A1, EP3121416A1, EP3392144A1 and EP3601057A1 describe an air intake unit for an aircraft engine comprising a main suction intake permanently engaged by an air filter and a bypass suction intake separate from the main suction intake and provided with a shutter element movable between a closed position in which it closes the bypass suction intake and an open position in which it leaves the passage through the bypass suction intake free.

Opening and closing of the bypass intake are controlled by an actuator device which generally makes use of a rotary electric motor which transmits the movement (by means of a gear transmission) to the movable parts which open and close the bypass intake.

Generally, the bypass air intake must be large enough to allow the suction of an adequate air flow rate and consequently the opening and closing stroke of the bypass air intake is relatively long (for example in the order of a few dozen centimeters). However, the actuator devices currently used in bypass intakes are fairly slow (with opening speeds in the order of 6-8 mm/s) and therefore they can take dozens of seconds to completely open the bypass air intake; this slow opening of the bypass air intake can be dangerous because in the case of rapid clogging of the air filter, it could result in lack of air to the engine (and therefore a substantial reduction in engine performance) for several seconds. In order to substantially increase the opening speed, an electric motor must be used in the actuator device; said electric motor improves performance but is also much bulkier, much heavier and absorbs in use much more electric power (and said electric power may not always be available on board the helicopter). Alternatively, to increase the opening speed, the opening and closing stroke of the bypass air intake must be reduced, and this entails a reduction in the area of passage of the air through the bypass air intake and an overall increase in the dimensions of the bypass air intake.

The patent application EP2957503A1 describes an aircraft equipped with at least two motors, each of which comprises a main air inlet opening provided with an air filter and a bypass air inlet opening provided with a bypass door that can be operated by a control element.

The U.S. Pat. No. 5,662,292A describes an air filter arranged in front of a helicopter turbine inlet; a bypass mechanism is provided should the pressure differential across the air filter exceed a predetermined value.

SUMMARY OF THE DISCLOSURE

An object of the present disclosure is to provide an air intake unit for a vehicle engine that allows an extremely rapid opening of the bypass air intake to be obtained without a significant increase in dimensions and weight of the actuator device that controls the opening of the bypass air intake. Namely, the present disclosure allows a large bypass opening to be opened almost instantly thus guaranteeing the safety of the engine and the flight.

According to the present disclosure, an air intake unit for a vehicle engine is provided.

BRIEF DESCRIPTION OF THE DRAWINGS

The present disclosure will now be described with reference to the attached drawings, which illustrate a non-limiting embodiment thereof.

DETAILED DESCRITPTION OF THE DISCLOSURE

Figure 1:
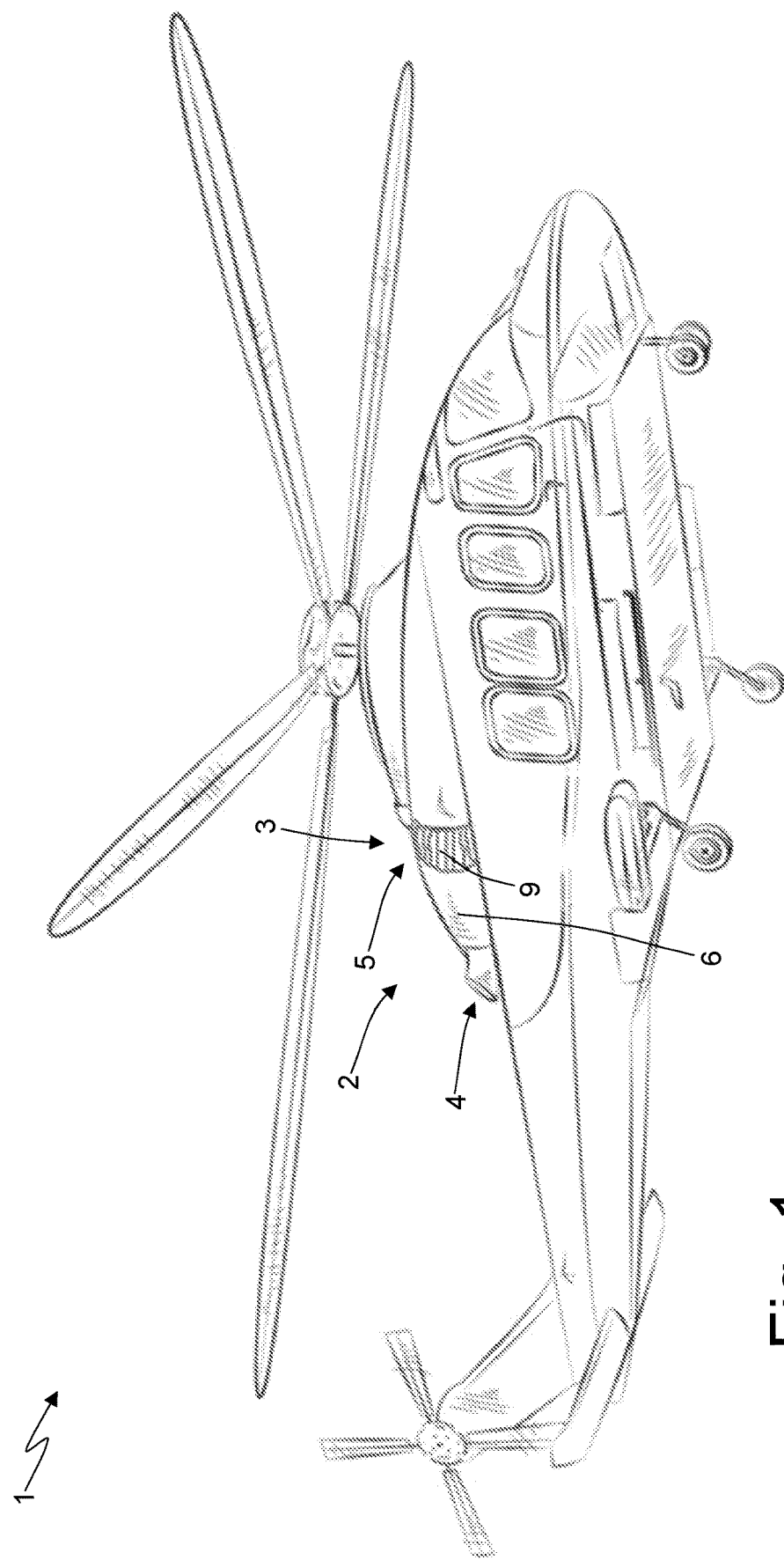
FIG. 1 is a schematic perspective view of a helicopter comprising a pair of twin turbine engines, each of which is provided with an air intake unit produced in accordance with the present disclosure.

In FIG. 1, the number 1 indicates overall a helicopter comprising two twin turbine engines 2 (only one of which can be seen in FIG. 1) which drive a blade assembly enabling the helicopter to lift off and touch down vertically, to hover, and to move laterally, backwards or forwards.

Each turbine engine 2 is contained in a tubular casing having at the front an air intake opening 3 (through which the turbine engine 2 sucks in the air coming from the outside required for its operation, namely the external air containing the oxygen required for combustion) and at the back an air exhaust opening 4 (through which the turbine engine 2 expels the exhaust gases produced by the combustion). At the air intake opening 3 of each turbine engine 2, an air intake unit 5 is arranged through which the air sucked in by the turbine engine 2 flows.

Figure 2:
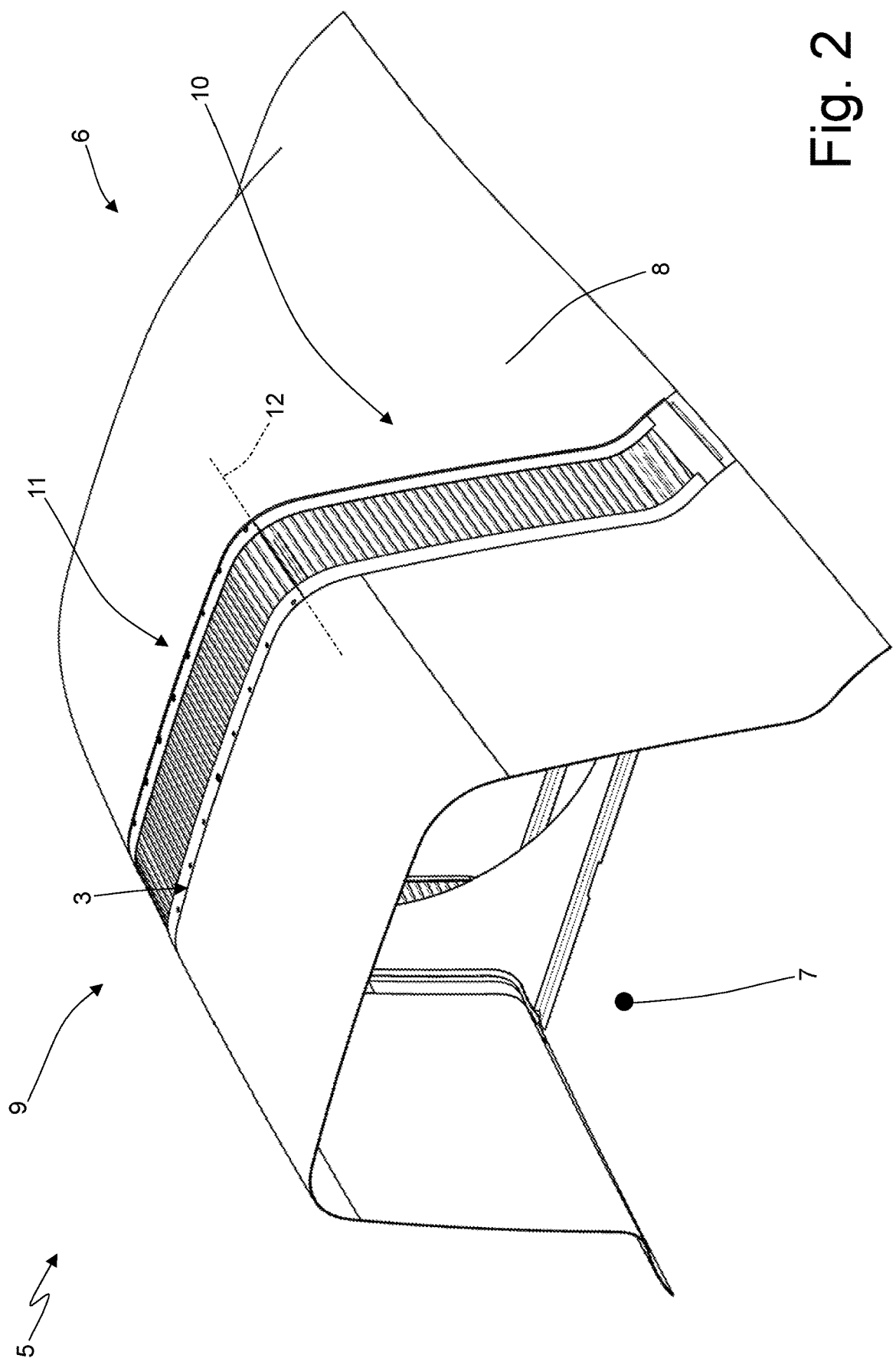
FIGS. 2 and 3 are two perspective views of part of one of the two air intake units of FIG. 1 with an air filter in a closed configuration and in an open configuration respectively.
Figure 3:
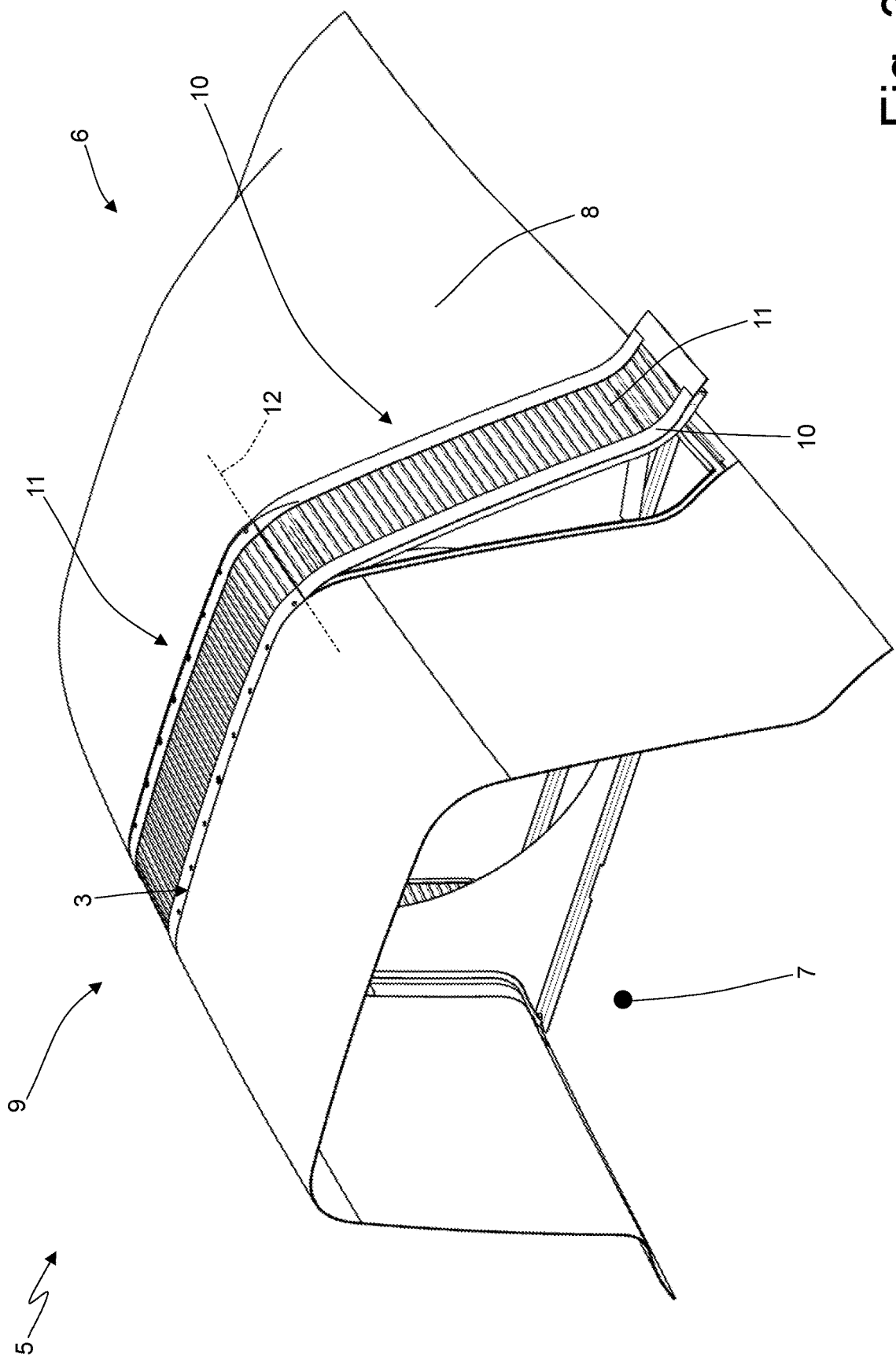

As illustrated in FIGS. 2 and 3, each intake unit 5 comprises a hollow housing 6 inside which a plenum 7 (namely a suction chamber) is defined which is in pneumatic communication with the turbine engine 2. Each housing 6 has an outer wall 8 provided with the intake opening 3 which is U-shaped and through which the air coming from the outside necessary for operation of the turbine engine 2 can be sucked; in other words, the external air necessary for the operation of each turbine engine 2 can enter the plenum 7 passing through the intake opening 3 and then from the plenum 7 can reach the turbine engine 2. In the embodiment illustrated in the attached FIGS., each housing 6 comprises a single intake opening 3, but according to other embodiments not illustrated and perfectly equivalent, each housing 6 comprises several intake openings 3 beside one another. Furthermore, according to other embodiments not illustrated, the intake opening 3 could have a different shape (for example an L-shape or a flat shape).

Each intake unit 5 comprises an air filter 9 which is supported by the housing 6 and completely engages the intake opening 3 to normally filter the air coming from the outside that flows through the intake opening 3, entering the plenum 7; in other words, the air filter 9 reproduces the shape of the intake opening 3 so as to engage without clearance the intake opening 3 and therefore normally filter all the air that passes through the intake opening 3 to enter the plenum 7 (therefore varying the shape of the intake opening 3 consequently varies the shape of the air filter 9).

Figure 4:
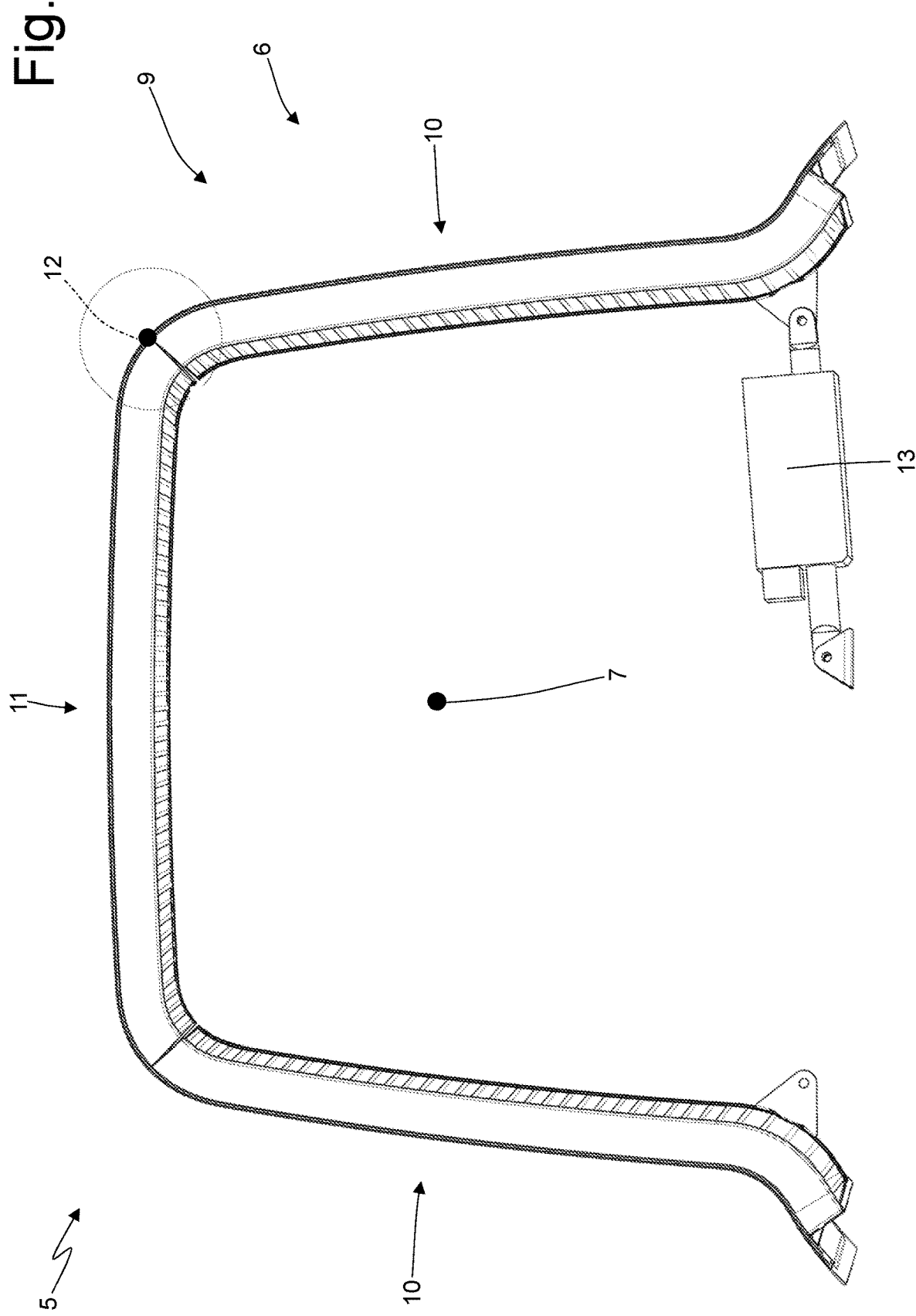
FIG. 4 is a cross section view of part of the intake unit of FIGS. 2 and 3 with the air filter in a closed configuration.

As illustrated in FIGS. 3 and 4, the air filter 9 comprises a fixed portion 10 arranged in the center and two movable portions 11 arranged laterally on opposite sides of the fixed portion 10; the fixed portion 10 of the air filter 9 is stably connected to the wall 8 of the housing 6 and therefore in use it does not carry out any type of movement relative to the wall 8 of the housing 6, while each movable portion 11 of the air filter 9 only rests on the wall 8 of the housing 6 and therefore in use can move relative to the wall 8 of the housing 6. In other words, the fixed portion 10 of the air filter 9 is mounted in a fixed position on the wall 8 of the housing 6 (namely it always stays in the same position without ever carrying out any type of movement), while the two movable portions 11 of the air filter 9 are mounted to be movable (namely they are only resting) on the wall 8 of the housing 6 to move relative to the wall 8 of the housing 6 (therefore relative to the fixed portion 10 of the air filter 9).

In particular, each movable portion 11 rotates relative to the fixed portion 10 around a rotation axis 12 arranged longitudinally (namely parallel to a central axis of the housing 6) and under the thrust of a corresponding actuator device 13 between a closed position (or work position and illustrated in FIGS. 2 and 4) and an open position (or rest position and illustrated in FIG. 3). FIG. 4 illustrates for clarity only one of the two actuator devices 13, but in reality there are two actuator devices 13 (one for each movable portion 11); alternatively, according to a different embodiment, one single actuator device 13 could be provided which by means of appropriate mechanical relays moves both the movable portions 11.

In the closed position (illustrated in FIGS. 2 and 4), each movable portion 11 completely seals the intake opening 3, thus allowing the air to enter the intake opening 3 only by crossing the air filter 9; in the open position, on the other hand (illustrated in FIG. 3), each movable portion 11 leaves a part of the intake opening 3 free and therefore the air can enter the intake opening 3 also without crossing the air filter 9.

In the embodiment illustrated in the attached FIGS., the air filter 9 comprises one single fixed portion 10 and two movable portions 11; according to other embodiments not illustrated, the air filter 9 comprises a different number and/or a different shape of fixed portions 10 and movable portions 11 (for example a single fixed portion 10 and a single movable portion 11, two fixed portions 10 and two movable portions 11, two fixed portions 10 and three movable portions 11 . . . ).

When each movable portion 11 is in the closed position (illustrated in FIGS. 2 and 4), the air coming from the outside can enter the plenum 7 (and therefore reach the turbine engine 2) only by passing through the air filter 9; any impurities present in the air are blocked by the air filter 9 but, conversely, the passage through the air filter 9 causes a pressure loss in the air sucked in which negatively affects the performance of the turbine engine 2. On the other hand, when each movable portion 11 is in the open position (illustrated in FIG. 3), the air coming from the outside can enter the plenum 7 (and therefore reach the turbine engine 2) both by passing through the air filter 9 and by passing beside the movable portion 11 and therefore without crossing the air filter 9; no significant pressure loss occurs in the air sucked in but, conversely, any impurities present in the air are not blocked by the air filter 9. Obviously, when each movable portion 11 is in the open position (illustrated in FIG. 3), almost all the air that enters the plenum 7 to reach the turbine engine 2 passes beside the air filter 9 rather than across the air filter 9, since the crossing of each movable portion 11 entails greater pressure losses.

Each air intake unit 5 comprises an electronic control unit, which drives the actuators 13 to move the movable portions 11 between the closed position (illustrated in FIGS. 2 and 4) and the open position (illustrated in FIG. 3). According to a possible embodiment, each electronic control unit is connected to a pressure sensor, which is arranged in the plenum 7 and measures the pressure of the air being sucked in after crossing the air filter 9; when the pressure of the air being sucked in measured by the pressure sensor is below a threshold value, the corresponding movable portions 11 are arranged and maintained by the electronic control unit in the open position (illustrated in FIG. 3) regardless of the vicinity of the helicopter 1 to the ground. In other words, the pressure of the air being sucked in measured by each pressure sensor indicates the clogging of the corresponding air filter 9, since the more the air filter 9 is clogged, the lower the pressure of the intake air measured by the pressure sensor; therefore, when the air filter 9 is too clogged, namely when the pressure of the intake air measured by the pressure sensor is lower than a threshold value, each movable portion 11 is arranged and maintained by the electronic control unit in the open position (illustrated in FIG. 3) to avoid excessively penalizing the performance of the turbine engine 2.

In other words, in the embodiment illustrated in the attached figures, each intake unit 5 comprises the housing 6 inside which the plenum 7 is defined, connectable to the engine 2, (at least) one main air intake through which the air coming from the outside required for operation of the engine 2 can be sucked into the plenum 7, and the air filter 9 which engages the main air intake to filter the air coming from the outside that flows through the main air intake. Furthermore, each intake unit 5 comprises at least a bypass air intake through which the air coming from the outside required for operation of the engine 2 can be sucked into the plenum 7 (alternatively to the main air intake), a shutter element which is coupled to the bypass air intake and is mounted to move between a closed position in which it closes the bypass air intake and an open position in which it leaves the passage through the bypass air intake free, and the actuator device 13 configured to move the shutter element between the closed position and the open position.

In the embodiment illustrated in the attached figures, in each intake unit 5 the main air intake coincides with the bypass air intake (namely they are the same intake opening 3 through the housing 6) and the air filter 9 is mounted to be movable to form the shutter element. According to a different embodiment not illustrated, the main air intake is separate from and independent of the bypass air intake (namely they are two different intake openings through the housing 6).

Figure 5:
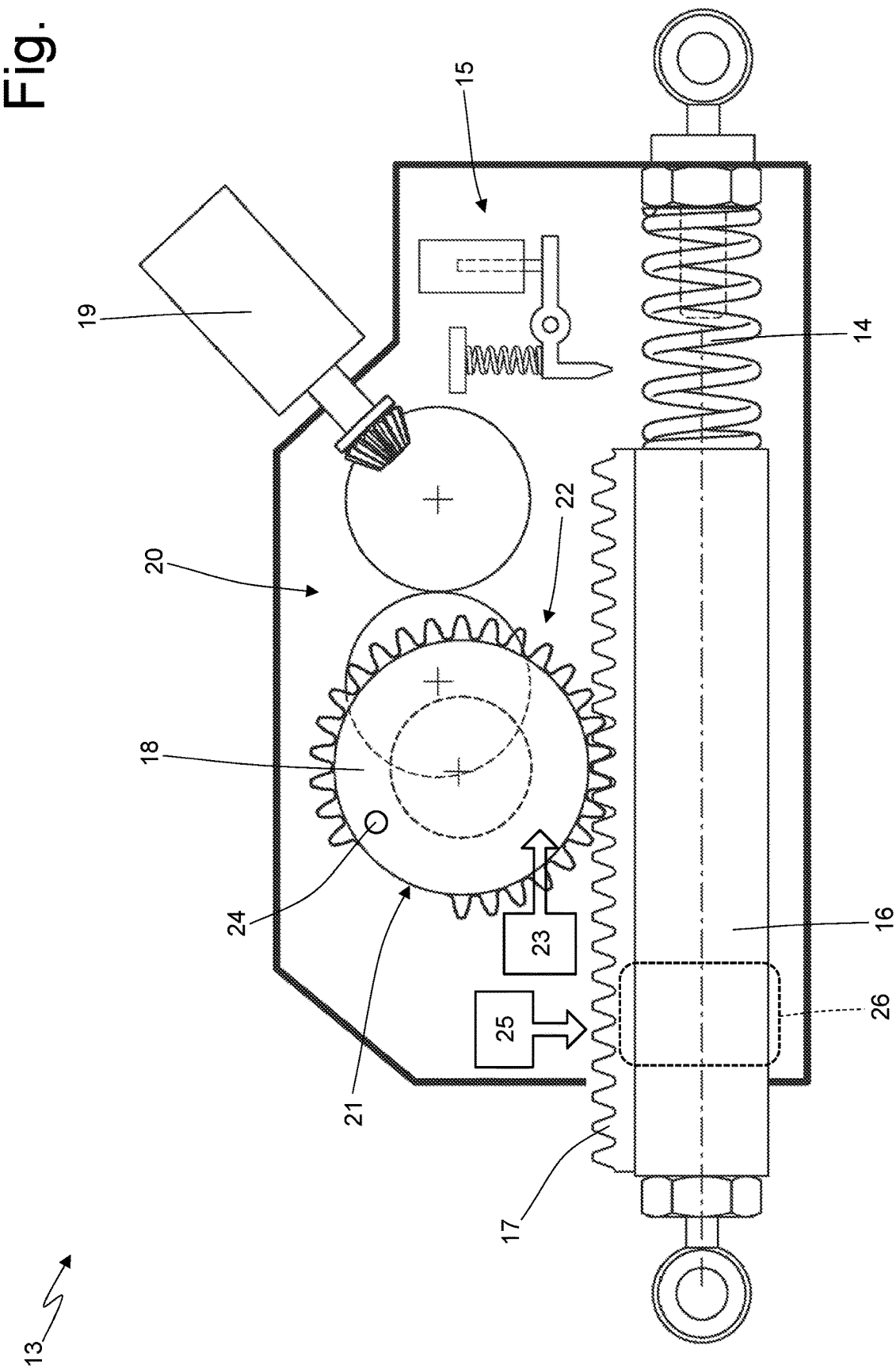
FIGS. 5 and 6 are two schematic views of an actuator device of one of the two air intake units of FIG. 1 in two different positions.
Figure 6:
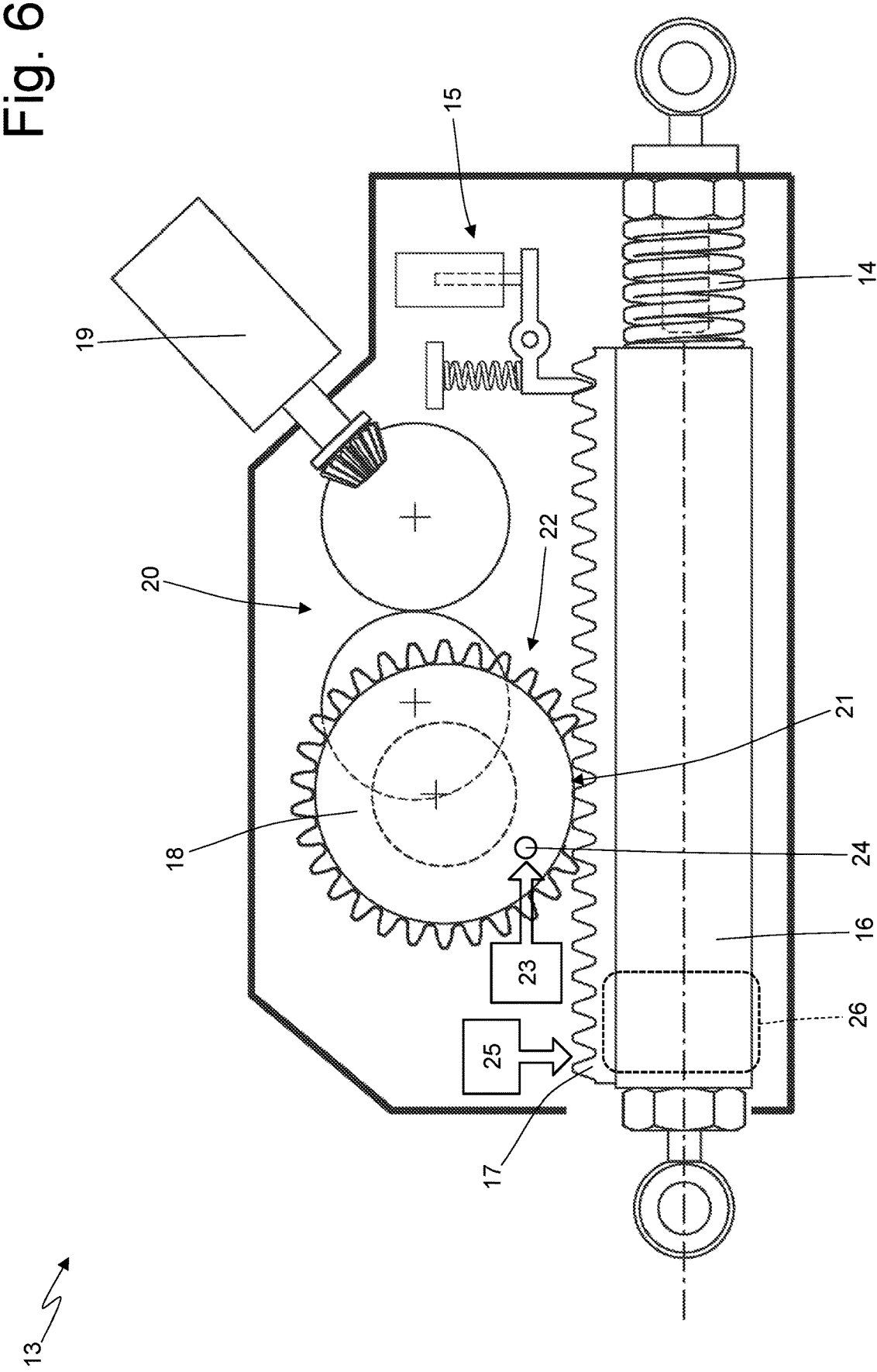

As illustrated in FIGS. 5 and 6, each actuator device 13 comprises a spring 14 configured to generate, by expanding, an opening movement that moves the shutter element (which engages the bypass air intake) from the closed position (illustrated in FIG. 6) to the open position (not illustrated since in FIG. 5 a partially open or partially closed intermediate position is illustrated). In the embodiment illustrated in the attached figures, the spring 14 is a compression spring. In the embodiment illustrated in the attached figures, the spring 14 is mechanical and of helical type;

according to other embodiments not illustrated, the spring 14 is mechanical and has a different shape from the helical shape, or the spring 14 is pneumatic (i.e. it is a gas spring).

The actuator device 13 comprises a holding member 15 which is configured to block the spring 14 in a compressed configuration and can be controlled to release the spring 14 when it is necessary to move the shutter element (which engages the bypass air intake) from the closed position to the open position. Namely, by controlling the holding member 15, the spring 14 can be freed (released) and is thus free to expand using the elastic force stored during the previous compression; the expansion of the spring 14 no longer constrained by the holding member 15 moves the shutter element (which engages the bypass air intake) from the closed position to the open position. According to a preferred embodiment, the holding member 15 can be electrically controlled, namely it has an electric actuator which, when activated, frees (releases) the spring 14. According to a possible embodiment, the holding member 15 could also comprise a manual control for use alternatively to the electric control in the event of malfunctioning of the electric control.

The actuator device 13 comprises an actuation body 16 which at one end is connected to the shutter element (which engages the bypass air intake), at the opposite end is connected to the spring 14, and is mounted movable to translate linearly between the closed position and the open position. In the embodiment illustrated in the attached figures, the actuation body 16 has a cylindrical shape and translates axially between the closed position and the open position; according to other embodiments not illustrated, the actuation body 16 could also have other shapes.

According to a preferred embodiment, the actuator device 13 comprises a rack 17 (or tooth unit), namely a linear gear, which is integral with the actuation body 16; furthermore, the actuator device 13 comprises a toothed wheel 18 which meshes with the rack 17 and is configured to be caused to rotate by a rotary electric motor 19 so as to push the actuation body 16 towards the closed position, compressing the spring 14. In other words, to move the actuation body 16 (integral with the shutter element) from the closed position to the open position, the elastic force of the spring 14 is used, said spring expanding, whereas to move the actuation body 16 (integral with the shutter element) from the open position to the closed position compressing the spring 14 (namely reloading the spring 14 for the next opening), the motive force generated by the electric motor 19 is used. It is important to note that the opening stroke performed using the elastic force of the spring 14 which expands is very fast (even less than one second or just over a second) while the closing stroke performed using the motive force generated by the electric motor 19 is very slow (as it also has to compress the spring 14) and therefore can last even dozens of seconds.

According to a preferred embodiment, the holding member 15 comprises its own tooth which meshes with the teeth of the rack 17 to retain the rack 17 and therefore the actuation body 16 which is integral with the rack 17.

In the embodiment illustrated in the attached figures, the actuator device 13 comprises a gear train 20 that connects the electric motor 19 to the toothed wheel 18, gearing down the rotation of the electric motor 19; namely, due to the gear train 20, the toothed wheel 18 rotates more slowly (even dozens of times more slowly) than the electric motor 19.

In the embodiment illustrated in the attached figures, the electric motor 19 (configured to cause the rotation of the toothed wheel 18) is integrated in the actuator device 13, namely it is stably part of the actuator device 13. According to a different embodiment, the electric motor 19 (configured to cause the rotation of the toothed wheel 18) is external to and independent of the actuator device 13 and can be connected when necessary to a power take-off of the actuator device 13; namely the electric motor 19 is connected to the power take-off of the actuator device 13 when the helicopter 1 is at a standstill on the ground and is under maintenance to reset the shutter element to the closed position after the shutter element has been open in flight due to clogging of the air filter 9.

According to a preferred embodiment illustrated in the attached figures, the toothed wheel 18 comprises a sector 21 without teeth which, when in the area of the rack 17, allows the rack 17 to slide freely relative to the toothed wheel 18. In other words, the sector 21 without teeth has an angular extension of approximately 40°-50° and when it is arranged on the rack 17 it annuls all mechanical interaction between the toothed wheel 18 and the rack 17, thus allowing the rack 17 to slide freely relative to the toothed wheel 18.

The toothed wheel 18, in addition to the sector 21 without teeth, has a toothed sector 22, namely provided with teeth, which is complementary to the sector 21 without teeth. The toothed sector 22 of the toothed wheel 18 has an extension at least equal to a stroke covered by the actuation body 16 to translate linearly between the closed position and the open position; in this way the complete stroke of the actuation body 16 between the closed position and the open position is performed by less than one rotation of the toothed wheel 18, namely causing the toothed wheel 18 to carry out a rotation that extends from a beginning and an end of the toothed sector 22.

According to a preferred embodiment illustrated in the attached figures, the actuator device 13 comprises a holding member 23 which is configured to block the rotation of the toothed wheel 18 when the actuation body 16 is in the closed position (namely when the sector 21 without teeth of the toothed wheel 18 is in the area of the rack 17). The function of the holding member 23 is to guarantee that when the actuation body 16 is in the closed position (namely when the sector 21 without teeth of the toothed wheel 18 is in the area of the rack 17), only the sector 21 without teeth of the toothed wheel 18 is always in the area of the rack 17 (which allows free sliding of the rack 17 and therefore of the actuation body 16 relative to the toothed wheel 18). Namely, the function of the holding member 23 is to prevent the toothed wheel 18 from performing rotations when the actuation body 16 is in the closed position (namely when the sector 21 without teeth of the toothed wheel 18 is in the area of the rack 17) to guarantee that only the sector 21 without teeth of the toothed wheel 18 is always in the area of the rack 17 (which allows free sliding of the rack 17 and therefore of the actuation body 16 relative to the toothed wheel 18).

According to a preferred embodiment, the holding member 23 comprises a striker body 24 integral with the toothed wheel 18, a holding element configured to engage with the striker body 24, and a transmission that moves the holding element taking the motion from the actuation body 16 so that the holding element engages the striker body 24 only when the actuation body 16 is in the closed position (i.e. it reaches the closed position).

According to a different embodiment not illustrated, the actuator device 13 comprises a disengagement member (for example a clutch) which can be operated to separate the toothed wheel 18 from the electric motor 19 (namely to interrupt the mechanical connection between the toothed wheel 18 and the electric motor 19); in this embodiment, the toothed wheel 18 does not have the sector 21 without teeth and therefore remains always meshed with the rack 17, but thanks to the disengagement member it rotates idle on itself when the actuation body 16 moves from the open position to the closed position under the thrust of the spring 14.

According to a preferred embodiment illustrated in the attached figures, the actuator device 13 comprises a holding member 25 which is configured to block the actuation body 16 in the open position, namely to maintain the actuation body 16 in the open position thus avoiding undesired closing of the actuation body 16 (namely of the shutter element).

According to a preferred embodiment illustrated in the attached figures, the actuator device 13 comprises a shock absorber 26 that slows down an opening movement of the actuation body 16 (namely of the shutter element) from the closed position to the open position when the actuation body 16 (namely the shutter element) is near the open position.

According to a preferred embodiment, the spring 14 generates a progressive elastic force, namely the elastic constant of the spring 14 is not constant but higher near the closed position and lower near the open position; in other words, the spring 14 generates a greater elastic force when the actuation body 16 is near the closed position (when a greater thrust is required to move the actuation body 16 which is at a standstill) and generates a lesser elastic force when the actuation body 16 is near the open position (when the opening stroke has been almost completed).

In other words, each actuator device 13 exploits the actuation body 16 preloaded by means of the spring 14 (mechanical or gas) which, once "released", imparts to the actuation body 16 the force necessary to open the shutter element and therefore to open the bypass air intake, hence the opening is practically instantaneous. Once the spring 14 has been preloaded (compressed), the actuation body 16 is kept in position by means of the holding member 15 controlled by a solenoid and if necessary also by a mechanical cable (by redundancy).

The embodiment illustrated by way of example in the figures illustrated refers to a turbine engine 2, but the present disclosure can be advantageously applied in any type of aircraft engine.

It is important to note that each air intake unit 5 described above can be coupled to the main engine of the helicopter 1 or to an auxiliary engine of an auxiliary power unit (APU—Auxiliary Power Unit); in other words, each air intake unit 5 described above can be used in any situation where it is necessary to suck in fresh air from the external environment for the operation of an engine (main or auxiliary) of the helicopter 1.

The embodiment illustrated by way of example in the figures refers to a helicopter 1, but the present disclosure can be advantageously applied in any type of aircraft, therefore also an aeroplane or land or seagoing vehicles different from an aircraft.

The embodiments described here can be combined with one another without departing from the protective scope of the present disclosure.

The air intake unit 5 described above has numerous advantages.

The air intake unit 5 described above allows the shutter element (which engages the bypass air intake) to be opened extremely quickly so that if necessary, the bypass air intake can be opened practically instantly (to avoid torque holes on the engine 2).

Furthermore, the air intake unit 5 described above has a high intrinsic safety level, since the shutter element (which engages the bypass air intake) opens due to the elastic force stored in the spring 14 which has been previously compressed and therefore does not depend on the operation of an actuator.

Lastly, the air intake unit 5 described above is simple and inexpensive to produce as it exploits a passive element (namely the spring 14 which is substantially a piece of bent iron) to open the shutter element (which engages the bypass air intake).

LIST OF REFERENCE NUMBERS OF THE FIGURES

1 helicopter
2 turbine engines
3 intake opening
4 exhaust opening
5 intake unit
6 housing
7 plenum
8 wall
9 air filter
10 fixed portion
11 movable portion
12 rotation axis
13 actuator device
14 spring
15 holding member
16 actuation body
17 rack
18 toothed wheel
19 motor
20 gear train
21 sector without teeth
22 toothed sector
23 holding member
24 striker body
25 holding member
26 shock absorber

What is claimed is:

1. An air intake unit for an engine of a vehicle, the air intake unit comprising:
    a housing inside which a plenum is defined that can be connected to the engine;
    a bypass air intake, through which air coming from an outside needed for operation of the engine can be sucked into the plenum;
    a shutter element coupled to the bypass air intake, wherein the shutter element is mounted to be movable between a closed position, in which the shutter element closes the bypass air intake, and an open position, in which the shutter element leaves a passage through the bypass air intake open; and
    an actuator configured to move the shutter element between the closed position and the open position,
    wherein the actuator comprises a spring configured to generate, by expanding, an opening movement moving the shutter element from the closed position to the open position,
    wherein the actuator comprises a first holding member, which is configured to lock the spring in a compressed configuration corresponding to the shutter element in the closed position,
    wherein the actuator comprises an actuation body connected to the shutter element at a first end and connected to the spring at a second end opposite the first end, a rack that is integral to the actuation body, a toothed wheel that meshes with the rack, and a second holding member that is configured to stop a rotation of the toothed wheel when the actuation body is in the closed position,
    wherein the actuation body is movably mounted to linearly translate between the closed position and the open position,
    wherein the toothed wheel is configured to be caused to rotate to push the actuation body towards the closed position compressing the spring,
    wherein the toothed wheel comprises a sector without teeth that allows the rack to freely slide relative to the toothed wheel when the sector without teeth is in an area of the rack,
    wherein the first holding member of the actuator can be controlled to release the spring when the shutter element needs to be moved from the closed position to the open position so that the spring, no longer constrained by the first holding member, is free to expand by an elastic force stored during the previous compressed configuration and thereby move the shutter element from the closed position to the open position, and
    wherein the second holding member comprises a striker body that is integral to the toothed wheel, a holding element configured to engage the striker body, and a transmission that moves the holding element by taking motion from the actuation body so that the holding element engages the striker body only when the actuation body is in the closed position.

2. The air intake unit according to claim 1, wherein the actuator comprises an electric motor that is configured to rotate the toothed wheel to push the actuation body towards the closed position compressing the spring.

3. The air intake unit according to claim 2, wherein the electric motor is integrated in the actuator.

4. The air intake unit according to claim 2, wherein the electric motor is external and independent of the actuator and can be connected, when needed, to a power take-off of the actuator.

5. The air intake unit according to claim 2, wherein the actuator comprises a gear train connecting the electric motor to the toothed wheel.

6. The air intake unit according to claim 1,
    wherein the toothed wheel comprises a toothed sector that is complementary to the sector without teeth,
    wherein the toothed sector is provided with teeth, and
    wherein the toothed sector has an extension that is at least the same as a stroke covered by the actuation body to linearly translate between the closed position and the open position.

7. The air intake unit according to claim 1, wherein the actuator comprises a third holding member that is configured to lock the actuation body in the open position.

8. The air intake unit according to claim 1, wherein the spring generates a progressive elastic force that is greater when the actuation body is close to the closed position and smaller when the actuation body is close to the open position.

9. The air intake unit according to claim 1, wherein the actuator comprises a shock absorber that slows down an opening movement of the shutter element from the closed position to the open position when the shutter element is close to the open position.

10. The air intake unit according to claim 1, further comprising:
   a main air intake through which air coming from an outside needed for operation of the engine can be sucked into the plenum; and
   an air filter that engages the main air intake to filter the air coming from an outside and flowing through the main air intake.

\* \* \* \* \*